(12) United States Patent
Gotmukle et al.

(10) Patent No.: US 12,503,930 B1
(45) Date of Patent: Dec. 23, 2025

(54) DUAL-ACTING DELAYED FILTERCAKE BREAKER FLUID

(71) Applicant: Halliburton Energy Services, Inc., Houston, TX (US)

(72) Inventors: Sharad Bhimrao Gotmukle, Pune (IN); Nivika Rajendra Gupta, Pune (IN); William W. Shumway, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/751,645

(22) Filed: Jun. 24, 2024

(51) Int. Cl.
*E21B 37/06* (2006.01)
*C09K 8/52* (2006.01)

(52) U.S. Cl.
CPC .............. *E21B 37/06* (2013.01); *C09K 8/52* (2013.01); *C09K 2208/30* (2013.01)

(58) Field of Classification Search
CPC ........ C09K 8/52; C09K 2208/26; C09K 8/68; C09K 8/72; C09K 8/74; C09K 8/035; C09K 8/528; E21B 37/00; E21B 37/06; E21B 21/003; E21B 33/138
See application file for complete search history.

(56) References Cited

U.S. PATENT DOCUMENTS

| | | | |
|---|---|---|---|
| 4,853,146 A | 8/1989 | Rorig et al. | |
| 7,998,910 B2 | 8/2011 | Todd | |
| 2014/0318788 A1 | 10/2014 | Agrawal et al. | |
| 2021/0332283 A1 | 10/2021 | Maghrabi | |

FOREIGN PATENT DOCUMENTS

CA  2807827 A1 * 6/2013 .............. C08L 1/284

* cited by examiner

*Primary Examiner* — Zakiya W Bates
(74) *Attorney, Agent, or Firm* — Sheri Higgins Law, PLLC; Sheri Higgins

(57) ABSTRACT

A filtercake breaker fluid can include a delayed acid and a viscosifier. The delayed acid can generate an acid downhole that breaks the filtercake. The viscosifier delays the breaking of the filtercake by the acid due to an increase in viscosity of the breaker fluid. The viscosifier can be a hydrophobically modified polymer or a viscoelastic surfactant.

18 Claims, 1 Drawing Sheet

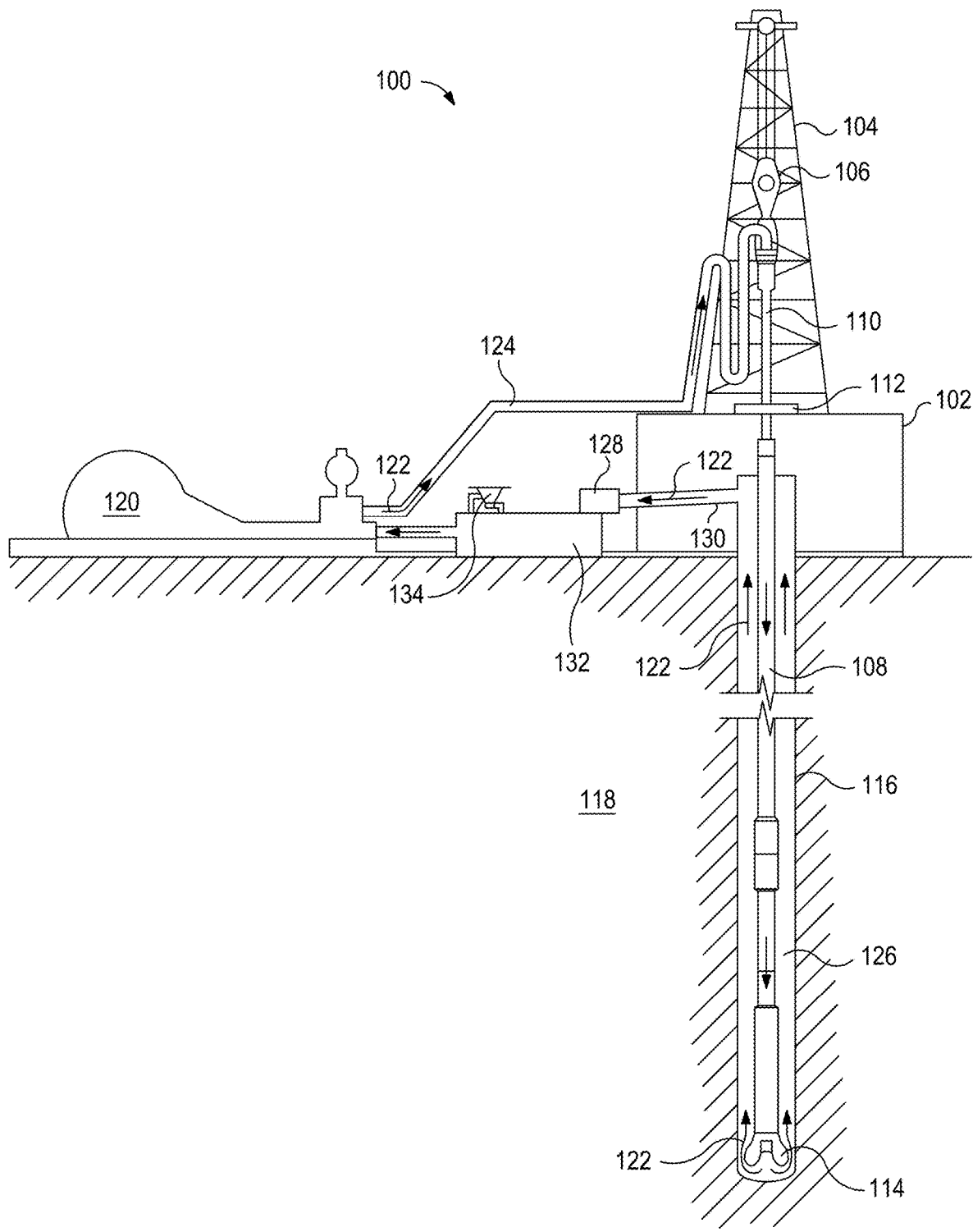

DUAL-ACTING DELAYED FILTERCAKE BREAKER FLUID

TECHNICAL FIELD

Wellbore treatment operations can involve forming a filtercake on a wellbore wall to mitigate fluid loss into a subterranean formation. A breaker fluid can be used to break up and remove the filtercake. The breaker fluid can be a delayed breaker that is dual acting by using a delayed acid generator and a viscosifier.

BRIEF DESCRIPTION OF THE FIGURES

The features and advantages of certain embodiments will be more readily appreciated when considered in conjunction with the accompanying FIGURES. The figures are not to be construed as limiting any of the preferred embodiments.

FIG. 1 illustrates a system for introducing a treatment fluid into a subterranean formation.

DETAILED DESCRIPTION

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be a slurry, which includes a continuous liquid phase and undissolved solid particles as the dispersed or discontinuous phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet (30.5 meters) radially of the wellbore. As used herein, "into a subterranean formation" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include but are not limited to the space between the wellbore wall and the outside of a tubing string in an open-hole wellbore; the space between the wellbore wall and the outside of a casing in a cased-hole wellbore; and the space between the inside of a casing and the outside of a tubing string in a cased-hole wellbore.

Oil or gas operations can be performed using a treatment fluid. The term "treatment fluid" refers to the specific composition of the fluid as it is being introduced into a well. The word "treatment" in the term "treatment fluid" does not necessarily imply any particular action by the fluid. Examples of treatment fluids include, but are not limited to, drilling fluids, spacer fluids, workover fluids, cement compositions, and stimulation fluids.

During drilling operations, a wellbore is formed using a drill bit. A drill string can be used to aid the drill bit in drilling through a subterranean formation to form the wellbore. The drill string can include a drilling pipe. A treatment fluid adapted for this purpose is referred to as a drilling fluid or drilling mud. The wellbore defines a wellbore wall that is the exposed portion of the subterranean formation where the wellbore was formed. The drilling fluid may be circulated downwardly through the drilling pipe and back up the annulus between the wellbore wall and the outside of the drilling pipe.

After a wellbore is formed, it may be desirable to perform a cementing operation. A treatment fluid called a spacer fluid can be introduced into the wellbore after the drilling fluid and before the cement composition. The spacer fluid can flush residual drilling fluid that may remain in parts of the wellbore or on the face of the subterranean formation to help ensure better bonding of the cement composition to the interface. Other types of oil or gas operations, for example, completion or workover operations can also be performed with a treatment fluid.

The wellbore wall and near-wellbore region of the subterranean formation can include permeable areas. Examples of permeable areas include cracks, natural fissures, fractures, vugs, interconnected pores, or induced fractures. Cracks, fissures, and fractures can generally be characterized as having a length greater than its diameter. Vugs and holes can be characterized as being any cavity having a variety of shapes and sizes. Porosity refers to the number of individual pores within an area of the subterranean formation. Permeability and all grammatical variations thereof, in this context, refers to the amount of interconnectivity between the individual pores that allows fluid to migrate or move between the interconnected pores. Permeable areas in the wall of the wellbore and near-wellbore region can vary and have dimensions ranging from less than 0.1 micrometers and as large as 50 micrometers or larger. As used herein, a "permeable area" means any area where fluid can flow into the subterranean formation via a wellbore and can include-without limitation-cracks, fissures, fractures, cavities, and interconnected pores.

Some of the base fluid or filtrate of a treatment fluid, such as a drilling fluid, can undesirably flow into the subterranean formation via the permeable areas instead of remaining in the wellbore and being circulated back up to the wellhead. This is known as fluid loss. In order to overcome the problems associated with fluid loss, a fluid loss control additive can be used. As the treatment fluid is placed into the well, the fluid loss control additive can eliminate or lessen the amount of liquid base fluid or filtrate entering the subterranean formation.

Fluid loss control additives can form a filtercake on the wall of the wellbore to reduce or stop fluid loss. A filtercake is the residue deposited on a permeable medium when a slurry, such as a drilling fluid, is forced against the medium under pressure. The filtrate is the liquid that passes through the medium, leaving the cake on the medium. In filtercake deposition, the slurry, that commonly includes materials including water, a gelling agent, bridging agents such as calcium carbonate, weighting agents, and/or polymers, is introduced into the open-hole wellbore. The fluid flows into a desired portion of the well. The ingredients in the fluid form the filtercake. The filtercake can be used to bind fines, such as sand, together, and prevent fluid loss into the subterranean formation.

After the filtercake is formed and any oil and gas operations that require a low fluid loss and hence require the filtercake are performed, it may be desirable to remove the filtercake from the wellbore wall. Removal of the filtercake can restore the permeability of the subterranean formation so fluids such as oil, gas, or water can be produced from the subterranean formation via the wellbore wall and wellbore. Fluids used for this purpose can be referred to as a filtercake breaker fluid. Acidic fluids can be used as a filtercake breaker fluid. The acid in the fluid functions to break down the components of the filtercake (e.g., cementitious ingredients and bridging agent) whereby the broken-down components can be flowed from the wellbore to restore the permeability.

However, there can be several issues with using acidic fluids. One example of such problems is the formation of hot spots. In typical acidizing operations for filtercake removal, an acid (e.g., formic acid) is pumped down the drill pipe and is not evenly distributed across the wellbore wall as it comes out of the drill pipe. This results in some areas having localized higher concentrations of acid and other areas having little to no acid. In the higher concentration areas, the acid is available to very quickly start breaking down the filtercake, in part due to the undesirably higher concentration. In the areas with little to no acid, the filtercake can remain intact and permeability is not restored. To try to counter this, an operator at the surface can move the drill pipe around as the acidizing fluid is pumped down the drill pipe in an effort to provide a more even distribution of the acid adjacent to the filtercake. However, it is not always possible to get an even distribution, so the acid can break down all of the filtercake even when moving the drill pipe.

A delayed acid breaker fluid can be used to try and rectify the problems associated with the formation of hot spots. A delayed acid breaker fluid can be used to allow the fluid to be pumped into the annulus and be located next to all areas of the filtercake. An acid is then generated or formed downhole and can then begin breaking down the filtercake. However, the amount of delay, which is the length of time from when the fluid is prepared to when the fluid is able to start breaking down the filtercake, can be difficult to control and adjust as needed. By way of example, the amount of delay may need to be 4 hours, but the delayed acid breaker fluid may only be capable of providing a 2-hour-delay. Thus, there is a long-felt need for delayed filtercake breaker fluids that solve the aforementioned problems.

It has been discovered that a delayed filtercake breaker fluid can have a dual function delaying system. A first additive, such as a delayed or retarded acid, can generate an acid and be used to break up the filtercake at a period of time after introduction into a wellbore. A second additive, such as a viscosifier, can be used to further delay contact of the acid with the filtercake, which increases the total amount of delay that can be obtained. The delay can advantageously be used when there is a need to perform other oil and gas operations, such as to remove the drill string or wash pipe from the wellbore before permeability is restored, or to pull the wash pipe past a flapper valve before the filtercake loses functionality, before breaking the filter cake. Both of these operations can ensure that hydrostatic control is maintained, and formation fluids do not reach the surface until production operations are ready to begin.

If any laboratory test (e.g., rheology or breakthrough) requires the step of mixing, then the drilling fluid or breaker fluid is mixed according to the following procedures. A known volume (in units of barrels) of the aqueous liquid is added to a mixing container and the container is then placed on a mixer base. The motor of the base is then turned on and maintained at 11,200 to 11,800 revolutions per minute (rpm). Any of the following ingredients are then added to the aqueous liquid and mixed for at least 5 minutes before adding the next ingredient, wherein the ingredients are added in order of the first ingredient to last ingredient as follows: a viscosifier; a filtration control agent; a shale stabilizer additive; a weighting agent; and a pH buffer. The ingredients can be added at a stated concentration of weight by volume of the drilling fluid, for example, in units of pounds per barrel of the drilling fluid. It is to be understood that any mixing is performed at ambient temperature and pressure—about 71° F. (22° C.) and about 1 atm (0.1 MPa).

It is also to be understood that if any laboratory test (e.g., rheology or breakthrough) requires the test be performed at a specified temperature and possibly a specified pressure, then the temperature and pressure of the fluid is ramped up to the specified temperature and pressure after being mixed at ambient temperature and pressure. For example, a drilling fluid can be mixed at 71° F. (22° C.) and 1 atm (0.1 MPa) and then placed into the testing apparatus and the temperature of the drilling fluid can be ramped up to the specified temperature. As used herein, the rate of ramping up the temperature is in the range of about 3° F./min to about 5° F./min (about 1.67° C./min to about 2.78° C./min) to simulate actual wellbore conditions. After the fluid is ramped up to the specified temperature and possibly pressure, the fluid is maintained at that temperature and pressure for the duration of the testing.

A fluid can have a desired viscosity. Viscosity is a measure of the resistance of a fluid to flow, defined as the ratio of shear stress to shear rate. Viscosity can be expressed in units of (force*time)/area. For example, viscosity can be expressed in units of dyne*s/cm$^2$ (commonly referred to as Poise (P)) or expressed in units of Pascals/second (Pa/s). However, because a material that has a viscosity of 1 P is a relatively viscous material, viscosity is more commonly expressed in units of centipoise (cP), which is 1/100 P.

A fluid, for example a drilling fluid or a filtercake breaker fluid, should exhibit good rheology and other properties, such as plastic viscosity, yield point, and gel strength. Rheology is a measure of how a material deforms and flows. As used herein, the "rheology" of a fluid is measured according to ANSI/API 13B-1 section 6.3, Recommended Practice for Field Testing of Water-based Drilling Fluids as follows. The fluid is mixed. The fluid is placed into the test cell of a rotational viscometer, such as a FANN® Model 35 viscometer, fitted with a Bob and Sleeve attachment and an F1 spring number. The fluid is tested at the specified temperature and ambient pressure, about 1 atm (0.1 MPa). Rheology readings are taken at multiple revolutions per minute "rpm," for example, at 3, 6, 100, 200, 300, and 600.

As used herein, the "plastic viscosity" ("PV") of a fluid is obtained from the Bingham-Plastic rheological model and calculated as the difference between the 600 rpm and 300 rpm dial readings from the rheology testing, expressed in units of cP.

The yield point ("YP") is defined as the value obtained from the Bingham-Plastic rheological model when extrapolated to a shear rate of zero. As used herein, the "yield point" of a fluid is calculated as the difference between the plastic viscosity and the 300-rpm dial reading, expressed in units of lb/100 ft$^2$. To convert the units to Pa, the difference is multiplied by 0.48.

A fluid can develop gel strength. As used herein, the "10 s gel strength" of a fluid is measured according to API 13B-2 Section 6.3, Recommended Practice for Field Testing of Oil-based Drilling Fluids or API 13B-1, Recommended Practice for Laboratory Testing of Drilling Fluids as follows. After the rheology testing of the fluid is performed, the fluid is allowed to sit in the test cell for 10 seconds(s). The motor of the viscometer is then started at 3 rpm. The maximum deflection on the dial reading is the 10 s gel strength in units of lb/100 ft$^2$. To convert the units to Pascal (Pa), the dial reading is multiplied by 0.511.

A breakthrough test can be used to determine the effectiveness of a filtercake breaker fluid. The breakthrough test is performed in two stages as follows. In the first stage, a filtercake is formed by placing an aloxite disc of appropriate pore throat size in the bottom end of double-ended HPHT cell. Fill the cell with 250 mL of a drilling fluid mud. Place disc and O-ring in the cell and screw on the lid, then close the top valve stem and lower the cell into a large heating jacket set at desired temperature. Apply a pressure of 200 psi to the inlet valve stem and open stem by turning it one half turn. Place a 25 mL measuring cylinder under the bottom valve stem. Increase the pressure to a desired amount (ideally BHTP, otherwise use 500 psi as the default) and open the bottom valve stem. Monitor the fluid loss for the agreed length of time required to make the filter cake. To build a proper filter cake the time will vary from generally 0.5 to 16 hours. When the time is up, close both bottom and top valve stems and turn off the pressure. Bleed pressure off top pressure line; and, ensuring that there is no pressure in the line, remove the locking pin and the top pressure line. Remove the cell from the jacket carefully and cool down gradually (to avoid sudden temperature changes) and release the pressure from the cell. After the first stage of filtercake formation, the second stage is performed as follows. Pour off any excess mud from the cell, being careful to leave the filter cake intact. Using a glass funnel/spatula, carefully pour the breaker solution down the side of the cell wall to avoid damaging the filter cake until it is approximately an inch from the top of the cell. Seal the cell up as before and lower it into the heating jacket. Place the top pressure unit on the inlet valve stem and insert locking pin to lock it in place. Apply 100 psi on top of the cell and heat up to the testing temperature. When the cell has reached the testing temperature, increase to desired pressure on top of the cell (ideally bottom hole static differential pressure or a predetermined test differential pressure). The next step is to determine fluid loss over time. It can be accomplished manually by using a graduated cylinder and observing fluid loss over periodic intervals. An alternative method is to use a recording balance to record the weight of filtrate collected over time. To use the balance method, start running relevant data collection software/hardware for the balances. Obtain a suitable container (e.g., a 50 ml beaker) and place on a balance under the bottom valve stem. Zero the balance. Regardless of collection method chosen, open the bottom valve stem (regardless of temperature). Record the time until breakthrough has occurred. Breakthrough occurs when all the breaker fluid has gone through the filter cake. After break through, close both bottom and top valve stems and turn off pressure. Switch off the heating jacket and allow the test cell to cool down. Bleed pressure off top pressure line; and, ensuring that there is no pressure in the line, remove the locking pin and the top pressure line. Carefully remove the filter disc from the cell, describe the filtercake that is left on the disk and take pictures of the disk from the top and from the sides.

A wellbore system can include: a filtercake disposed on at least a portion of a wall of a wellbore that penetrates a subterranean formation; and a filtercake breaker fluid located within the wellbore, the filtercake breaker fluid comprising: a base fluid; a delayed acid, wherein the delayed acid generates an acid within the wellbore, wherein the acid causes the pH of the filtercake breaker fluid to decrease to a pH less than or equal to 5, and wherein the acid breaks the filtercake; and a viscosifier, wherein the viscosifier increases the viscosity of the filtercake breaker fluid prior to or after the filtercake breaker fluid is located within the wellbore.

Methods of breaking a filtercake on a wellbore wall can include: introducing a filtercake breaker fluid into a wellbore that penetrates the subterranean formation, the filtercake breaker fluid comprising: a base fluid; a delayed acid; and a viscosifier, wherein the viscosifier causes the viscosity of the filtercake breaker fluid to increase before, during, or after introduction into the wellbore; causing or allowing the delayed acid to generate an acid after introduction into the wellbore, wherein the acid breaks at least a portion of the filtercake when the acid contacts the filtercake; and allowing the acid to break the portion of the filtercake on the wellbore wall, wherein the viscosifier delays the breaking of the portion of the filtercake by the acid compared to a fluid without the viscosifier.

It is to be understood that the discussion of any of the embodiments regarding the filtercake breaker fluid or any ingredient in the filtercake breaker fluid is intended to apply to all of the system, method, and composition embodiments without the need to repeat the various embodiments throughout. Any reference to the unit "gallons" means U.S. gallons.

A drilling fluid, also known as a drilling mud, can be used to form a wellbore that penetrates a subterranean formation. The wellbore has a wellbore wall. The methods can include forming the wellbore that penetrates the subterranean formation with the drilling fluid. The drilling fluid can form a filtercake on the wellbore wall. The drilling fluid can include a base fluid. The base fluid can be a hydrocarbon liquid-referred to as an oil-based mud (OBM). The base fluid can include dissolved materials or undissolved solids. The hydrocarbon liquid can be selected from the group consisting of a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a fractional distillate of crude oil is diesel oil. The saturated hydrocarbon can be an alkane or paraffin. The paraffin can be an isoalkane (isoparaffin), a linear alkane (paraffin), or a cyclic alkane (cycloparaffin). The unsaturated hydrocarbon can be an alkene, alkyne, or aromatic. The alkene can be an isoalkene, linear alkene, or cyclic alkene. The linear alkene can be a linear alpha olefin or an internal olefin.

The base fluid of the drilling fluid can include water-referred to as a water-based mud (WBM). The water can be selected from the group consisting of freshwater, seawater, brine, and any combination thereof in any proportion. The drilling fluid can include a water-soluble salt. The water-soluble salt can be selected from the group consisting of sodium chloride, calcium chloride, calcium bromide, potassium chloride, potassium bromide, magnesium chloride, sodium formate, potassium formate, cesium formate, zinc bromide, and any combination thereof. The water-soluble salt can be in a concentration in a range of 0.5 to 28 pounds per barrel (ppb) (1.9 to 108.2 kilograms per cubic meter ($kg/m^3$) of the drilling fluid. The choice of the water-soluble salt and its concentration can be dependent on formation types or to maintain hydrostatic pressure in the column of fluid.

The drilling fluid forms a filtercake on at least a portion of the wellbore wall. The filtercake can be used to reduce or prevent fluid loss of the base fluid and/or an internal phase of the drilling fluid into the subterranean formation. The drilling fluid can further include one or more ingredients that are responsible for forming the filtercake. The ingredients can include a bridging agent of insoluble particles. The insoluble particles can include, for example: ground coal; petroleum coke; sized calcium carbonate; barite; ilmenite; hematite; manganese tetroxide; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material (such as ethylene vinyl acetate); a polytetrafluoroethylene material; ground nut shells, for example walnut, almond, or pecan; ground seed shells, for example sunflower seed shells; ground fruit pits; clay; silica; alumina; fumed carbon; carbon black; recycled carbon black; graphite; mica; titanium oxide; meta-silicate; calcium silicate; calcium carbonate; kaolin; talc; zirconia; boron; fly ash; a hollow glass microsphere; any composite particle thereof; and any combination thereof. The insoluble particles can have a mean particle size measured at a largest dimension in a range of 5 to 1,200 micrometers. The bridging agent can be in a concentration in a range of 5 to 100 pounds per barrel (ppb) (19.3 to 386.5 kilograms per cubic meter "$kg/m^3$") of the treatment fluid. The ingredients can also include two or more compounds that chemically react in the presence of water to form a cementitious substance, for example, diatomaceous earth and lime.

The drilling fluid can also include other ingredients, for example, a viscosifier, a fluid loss agent, a pH buffer, a shale stabilizer, a hydration suppressant, a weighting agent, a lubricant, a thinner, a corrosion inhibitor, an emulsifier, a rheology modifier, a bridging agent, a lost circulation material, a salt, a thermal extender, a suspension aid, and combinations thereof.

The methods include introducing a filtercake breaker fluid into the wellbore. The filtercake breaker fluid includes a base fluid. The base fluid can be water. The water can be selected from the group consisting of freshwater, seawater, brine, and any combination thereof in any proportion. The filtercake breaker fluid can include a water-soluble salt. The water-soluble salt can be selected from the group consisting of sodium chloride, sodium bromide, calcium chloride, calcium bromide, potassium chloride, potassium bromide, magnesium chloride, sodium formate, potassium formate, cesium formate, zinc bromide, and any combination thereof. The density of the brine can be between 7 and 20 pounds per gallon (ppg) (0.84 to 2.40 kilograms per liter "kg/L").

The filtercake breaker fluid can include a delayed acid. As used herein, a "delayed acid" means any molecule or ion that cannot function as an acid (i.e., donate a proton) at the time the filtercake breaker fluid is introduced into the well, but rather functions as an acid at some period of time after introduction into the well. The delayed acid can be, for example, encapsulated such that the encapsulating material dissolves or erodes after a desired period of time to release the acid, contained within the base fluid, that then coalesces or inverts to release the acid, or an acid precursor. As used herein, an "acid precursor" is an organic compound (e.g., an ester of orthoformate or amide) that hydrolyzes and forms an acid in the presence of water. The acid precursor hydrolyzes when in contact with the water of the base fluid or water in a reservoir fluid to form an acid. Furthermore, strong acids (e.g., HCl, $HNO_3$, methanesulfonic acid, and chloroacetic acid), or acids that are weak acids (e.g., $H_3PO_4$, formic acid, acetic acid, lactic acid, citric acid, gluconic acid, and glycolic acid) can be retarded by forming one of various types of complexes with organonitrogen bases (Lewis bases) and zwitterions; for example, urea hydrochloride or alkylamine hydrochloride, or alkylamine alcohol hydrochloride complexes, and amino acid hydrochloride complexes referred to as retarded HCl acids, where the amino acid is any of the known amino acids, such as glycine, lysine, taurine, proline, etc., where alkyl can be methyl, ethyl, propyl, butyl and any corresponding isomer, and the acid can be any suitable Bronsted acid such as HCl, HF, $H_3PO_4$, formic acid, or methanesulfonic acid.

In some examples, when the acid is hydrofluoric acid, then the filtercake breaker fluid can include hydrofluoric acid generating compounds that can be used as a delayed HF source. Examples of hydrofluoric acid-generating compounds or precursors include, but are not limited to, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), perfluorinated organic compounds, boron trifluoride, and boron trifluoride complexes, derivatives thereof, and any combination thereof.

A delayed acid precursor can include, but is not limited to, esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, any derivative of the foregoing, and any combinations thereof. A delayed acid precursor can be by way of one non-limiting example, an ester of a carboxylic acid. The carboxylic acid can be, without limitation, formic acid, lactic acid, acetic acid, propionic acid, tartaric acid, or any aliphatic or aromatic acid. The acid generating inert agent used to generate the hydrofluoric acid solution can be a sulfonate ester and the acid generating activator used to generate the hydrofluoric acid solution can be a fluoride salt, wherein the sulfonate ester is selected from the group consisting of a methyl p-toluenesulfonate; an ethyl p-toluenesulfonate; a methyl o-toluenesulfonate; an ethyl o-toluenesulfonate; a methyl m-toluenesulfonate; an ethyl m-toluenesulfonate; a methyl methanesulfonate; an ethyl methanesulfonate; an any combinations thereof, and wherein the fluoride salt is selected from the group consisting of an ammonium fluoride; an ammonium bifluoride; a potassium fluoride; a potassium bifluoride; a sodium fluoride; a sodium bifluoride; a lithium fluoride; a lithium bifluoride; a rubidium fluoride; a rubidium bifluoride; a cesium fluoride; a cesium bifluoride; and any combinations thereof. The acid generating inert agent used to generate a hydrochloric acid solution can be a sulfonate ester and the acid generating activator used to generate the hydrochloric acid solution can be a chloride salt, wherein the sulfonate ester is selected from the group consisting of a methyl p-toluenesulfonate; an ethyl p-toluenesulfonate; a methyl o-toluenesulfonate; an ethyl o-toluenesulfonate; a methyl m-toluenesulfonate; an ethyl m-toluenesulfonate; a methyl methanesulfonate; and an ethyl methanesulfonate.

According to any of the embodiments, the delayed acid can be an ester that is a formic acid precursor. As the ester hydrolyzes in water, it generates formic acid. An example of the ester is shown below.

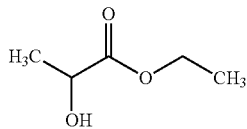

As used herein, a "retarded acid" is an acid in solution whose reactivity is slowed by addition of the viscosifier, so that the acid diffuses more slowly in the wellbore and/or so the acid penetrates deeper into a formation before being spent. Retarded acids can have a low pH in the acidic range at the wellhead prior to introduction; however, the nature of the viscosifier impacts the reactivity with formation materials by slowing the rate of reaction. The viscosifier potentially has the ability to both delay the acid formation by slowing hydrolysis of an ester, for example, or retard an acid by interacting with a proton's ability to dissolve the filtercake. It is to be understood that "introduction" means at the wellhead.

The volume of delayed acid used in the filtercake breaker fluid can range from 10 to 800 gallons per foot of the formation being treated. The concentration of the delayed acid can be in the range of 1% to 32% weight by weight of the base fluid "w/w," alternatively 5% to 22% w/w, alternatively 8% to 20% w/w.

The acid that is generated breaks at least a portion of the filtercake after introduction of the filtercake breaker fluid into the wellbore. As used herein, the term "break" and all grammatical variations in this context means some or all of the components of the filtercake are broken such that fluid flow through the wellbore wall (i.e., from an annulus through the wellbore wall and into the subterranean formation or vice versa) is restored. The filtercake can be broken for example by breaking up some components of the filtercake into smaller pieces that can be removed from the wellbore, solubilizing components of the filtercake, chelating or oxidizing parts of the filtercake, or combinations of these methods. According to any of the embodiments, the delayed acid generates an acid, wherein the pH of the filtercake breaker fluid decreases to a pH less than 5 or less than 4. According to any of the embodiments, the pH of the filtercake breaker fluid is decreased to a low enough pH that the filtercake can be broken, for example, to a pH less than or equal to a pH necessary to break down carbonates (e.g., sized calcium carbonate) and other components within the filtercake. It is to be understood that the pH of the filtercake breaker fluid decreases to the desired pH at a period of time after introduction of the filtercake breaker fluid into the wellbore. The period of time can be in a range of 0.25 to 48 hours and can be dependent on the bottomhole temperature of the wellbore. As used herein, the term "bottomhole" means at the location of the filter cake to be broken.

The filtercake breaker fluid also includes a viscosifier. The viscosifier increases the viscosity of the filtercake breaker fluid. The increase in viscosity can be measured as a percentage. The viscosifier can increase the viscosity of the filtercake breaker fluid in a range of 10% to 60% compared to an identical fluid except without the viscosifier. The increase in viscosity can also be measured as in increase in centipoise (cP). The viscosifier can increase the viscosity of the filtercake breaker fluid in a range of 2 to 20,000 cP compared to an identical fluid without the viscosifier. It is to be understood that as used herein, reference to an "identical fluid except without the viscosifier" means a fluid having the same ingredients and in the same concentrations as the filtercake breaker fluid except the viscosifier is not included as an ingredient.

The viscosifier can increase the viscosity of the filtercake breaker fluid prior to or during introduction into the wellbore; and hence, prior to when the filtercake breaker fluid is located within the wellbore. According to these embodiments, the viscosifier can be a hydrophobically modified natural or synthetic polymer. A hydrophobically modified natural polymer may be preferred because the acid will eventually degrade the natural polymer and viscosifier is less likely to damage the subterranean formation compared to a synthetic polymer.

A polymer is a large molecule composed of repeating units, typically connected by covalent chemical bonds. A polymer is formed from monomers. During the formation of the polymer during the polymerization reaction, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various ways along the polymer chain. For example, the repeating units can be random, alternating, periodic, or block. The conditions of the polymerization reaction can be adjusted to help control the average number of repeating units (the average chain length) of the polymer. As used herein, a "polymer" can include a cross-linked polymer. As used herein, a "cross link" or "cross linking" is a connection between two polymer molecules. A cross-link between two polymer molecules can be formed by a direct interaction between the polymer molecules, or conventionally, by using a cross-linking agent that reacts with the polymer molecules to link the polymer molecules.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight for a copolymer can be expressed as follows:

$$\text{Avg. molecular weight} = (M.W.m_1 * RU\ m_1) + (M.W.m_2 * RU\ m_2)\ldots$$

where $M.W.m_1$ is the molecular weight of the first monomer; $RU\ m_1$ is the number of repeating units of the first monomer; $M.W.m_2$ is the molecular weight of the second monomer; and $RU\ m_2$ is the number of repeating units of the second monomer. Of course, a terpolymer would include three monomers, a tetra polymer would include four monomers, and so on.

According to any of the embodiments, the hydrophobically modified polymer is a hydrophobically modified starch or starch derivative. The starch can be selected from the group consisting of cellulose, corn, potato, tapioca, and combinations thereof. The starch derivative can be hydroxyethyl cellulose. Unmodified starches, for example hydroxyethyl cellulose, typically do not increase the viscosity of a fluid to a level that is needed to further delay breaking of the filtercake or the concentration of the unmodified starch needs to be substantially increased to obtain the desired viscosity. However, a hydrophobically modified starch increases the viscosity due to micelle function and due to polymer-to-polymer interactions similar to cross-linking where a pseudo polymer network is formed. The pseudo polymer network has an increased molecular weight compared to an unmodified starch, for example on the order of an increase greater than or equal to 5 to 6 million Daltons, which increases the overall viscosity of the fluid.

The amount of hydrophobic modification can be in a range of 1% to 10% of the polymer. According to any of the embodiments, the amount of hydrophobic modification is a minimum amount such that the hydrophobically modified polymer forms a micelle in the filtercake breaker fluid. The hydrophobically modified polymer includes a hydrophobic and hydrophilic portion, similar to surfactants. The hydrophobically modified polymer, like a surfactant, is an amphiphilic molecule comprising a hydrophobic tail group and a hydrophilic head group. The hydrophilic head can be charged. A cationic surfactant includes a positively charged head. An anionic surfactant includes a negatively charged head. A zwitterionic surfactant includes both a positively- and negatively charged head. A surfactant with no charge is called a non-ionic surfactant. The hydrophobic portion(s) can be a long chain molecule, for example having a carbon chain length in a range of $C_8$ to $C_{22}$ or alternatively $C_{12}$ to $C_{18}$. The hydrophobic portions help to solubilize the hydrophobically modified polymer into the filtercake breaker fluid and the polymer itself, which can be a hydrophobically modified starch, will give the hydrophilicity to the polymer backbone and that will help disperse in a hydrophilic medium like brine or water. The long chain molecules can allow the hydrophobically modified polymer to form micelles in the filtercake breaker fluid. A "micelle" is an aggregate of molecules dispersed in a solution. The spontaneous formation of the micelles, which is independent of the concentration, increases the viscosity of the filtercake breaker fluid.

According to any of the embodiments, the initial molecular weight before formation of the pseudo polymer network is 0.5 to 2 million Daltons. The final molecular weight can be in a range of 4 to 20 million Daltons. One of the many advantages of using a hydrophobically modified polymer is that a much lower concentration is required than an unmodified polymer to obtain the same viscosity. However, if using an unmodified starch for example, the acid that is generated will not be available to break down the filtercake because it is breaking down the higher amount of the starch. Another significant advantage to using a hydrophobically modified polymer is that if an oil-based drilling mud is used to form the filtercake, then the hydrophobically modified viscosifier can help solubilize the filtercake.

According to other embodiments, the viscosity of the filtercake breaker fluid increases after the filtercake breaker fluid is introduced and located within the wellbore. According to these embodiments, the viscosifier can be a viscoelastic surfactant "VES." Viscoelasticity is the property of materials that exhibit both viscous and elastic characteristics when undergoing deformation. Viscous materials resist shear flow and strain linearly with time when a stress is applied; whereas elastic materials strain when stretched and quickly return to their original state once the stress is removed. Viscoelastic materials have elements of both of these properties and, as such, exhibit time-dependent strain.

There are several factors that can affect the viscoelasticity of a viscoelastic surfactant. For example, the shape of the aggregation of the micelles (whether rod-shaped or spherical-shaped) can depend on the chemical structure of the surfactant, concentration of the surfactant, the nature of counter ions present in the fluid, salt concentration, pH, solubilized components (if any), co-surfactants, and temperature. Salt present in the filtercake breaker fluid can help to form and stabilize micelle aggregation of the VES. According to any of the embodiments, the VES should function effectively at the concentration and type of salt selected in the filtercake breaker fluid.

The VES can be any anionic, cationic, zwitterionic, or neutral VES that is acid-activated upon acidification to increase the viscosity of the filtercake fluid. That is the acid that is generated from the delayed acid after introduction causes the VES to increase the viscosity when the VES comes into contact with the acid. By way of example, a neutral VES can have a positive charge change to positive or cationic after picking up a proton from the acid; an anionic VES can have a negative charge change to neutral after picking up the proton; and a zwitterionic VES can have a positive charge change to neutral. According to these embodiments, the viscosity of the filtercake breaker fluid does not increase until the pH of the fluid decreases to within the acidic range. An example of a preferred neutral amine is oleyl amine ethoxylate (OAE). The VES can be selected from the group consisting of oleylamido propyl dimethylamine+N,N-dimethyl hexadecyl amine, Gemini sulfonated surfactant, cationic amido propyl quats, betaine-VES, sultaine-VES, Gemini cationic surfactant, 3-(N-olcamidopropyl-N,N-dimethylammonium) propane-sulfonate, gondoyl dimethyl amidopropyl betaine (GDAB), Gemini zwitterionic viscoelastic surfactant, erucic amidopropyl betaine, and combinations thereof. According to any of the embodiments, the VES can have an alkyl chain length greater than or equal to 16. One of the many advantages to using a VES that requires coming in contact with the acid to become activated (i.e., to increase the viscosity) is that the viscosity of the filtercake breaker fluid is not increased until the pH reaches the acidic range, which can improve the pumpability of the fluid and ensure the delayed acid is uniformly distributed where the filtercake is located.

The viscosifier delays the breaking of the filtercake by the acid. In fluids without the viscosifier, the acid is free to diffuse much faster through the fluid to come into contact with the filtercake, which results in a much faster breaking of the filtercake. By way of example, the acid in a non-viscous or low viscosity fluid (e.g., a viscosity less than 1.0 cP) may break the filtercake in 2 hours. With the viscosifier, the viscosity of the fluid is increased, and the increased viscous fluid (e.g., a viscosity greater than 2 cP) slows the movement of the acidic protons so diffusion through the fluid is delayed and thus contact of the acidic protons with the surface of the filtercake is also delayed. By way of example, the breaking of the filtercake can be delayed by at least 30 minutes, 1 hour, 2 hours, or up to 10 hours compared to a fluid without the viscosifier. It is to be understood that as used herein, reference to a fluid without the viscosifier means that the comparison fluid can have some viscosity; however, the viscosity is at least 2 cP lower than the filtercake breaker fluid with the viscosifier.

According to any of the embodiments, the filtercake breaker fluid ultimately achieves a viscosity or plastic viscosity in a range of 2 to 20,000 cP. The viscosifier can delay breaking of the filtercake by a desired time. The desired time can be in a range of 30 minutes to 24 hours. The concentration of the viscosifier can be selected such that the final viscosity of the filtercake breaker fluid is within the stated range and the delay in breaking the filtercake is within the desired time. The viscosifier can be in a concentration in a range of 0.2 to 10 pounds per barrel "ppb" (0.8 to 38.7 kilograms per cubic meters "$kg/m^3$"). The viscosity and delay can be directly related. For example, the higher the viscosity, the longer the delay in breaking of the filtercake. According to any of the embodiments, the filtercake breaker fluid has a viscosity during introduction into the wellbore such that the fluid is pumpable. Accordingly, the selection of the viscosifier and the concentration can be selected such that the fluid is pumpable. By way of example, when using a hydrophobically modified polymer as the viscosifier, the viscosity of the fluid begins increasing when it is added to the base fluid prior to pumping the fluid into the wellbore. Therefore, the concentration of the hydrophobically modified polymer may need to be less than the concentration when a VES is used to allow the fluid to be pumpable. Accordingly, the delay of breaking the filtercake may be 1-3 hours. By way of another example, when using a VES as the viscosifier, the viscosity of the fluid does not begin increasing until after the fluid is pumped into the wellbore and the delayed acid generates the acid to lower the pH to within the acidic range. Therefore, the concentration of the VES can be greater than the concentration when using a hydrophobically modified polymer and still allow the fluid to be pumpable. Accordingly, a higher viscosity can be achieved after the fluid is located within the wellbore and the delay can be longer, for example 5 to 24 hours. The delayed filtercake breaker fluid has a dual-acting delay in breaking of the filtercake. The first action to delay the breaking is by using the delayed acid, and the second action to further delay the breaking is with the viscosifier. Accordingly, fluids only containing a delayed acid have only one way to delay the breaking; whereas the disclosed filtercake breaker fluid has two ways to delay the breaking wherein the viscosifier further delays the breaking compared to a fluid only having a delayed acid.

It is to be understood that while the filtercake breaker fluid can contain other ingredients, it is the viscosifier that is primarily or wholly responsible for delaying breaking of the filtercake by the delayed acid. For example, a "test filtercake breaker fluid" that is identical to the filtercake breaker fluid can have the desired amount of delay. By way of another example, the "test filtercake breaker fluid" that is identical to the filtercake breaker fluid will have a longer delay in breaking of the filtercake compared to a "control test fluid" that does not include the viscosifier. Therefore, it is not necessary for the filtercake breaker fluid to include other additives to achieve the desired delay. It is also to be understood that any discussion related to a "test filtercake breaker fluid" or "control test fluid" is included for purposes of demonstrating that while the filtercake breaker fluid being introduced into a wellbore may contain other ingredients, it is the viscosifier that provides the desired delay. Therefore, while it may not be possible to perform a test in a wellbore for the specific filtercake breaker fluid being introduced, one can formulate a test filtercake breaker fluid to be tested in a laboratory to identify if the ingredients and concentration of the ingredients will provide the desired delay.

The filtercake breaker fluid can also contain other ingredients. The other ingredients can be a shale stabilizer; a pH buffer; a corrosion inhibitor; a mutual solvent; an oxidizer; a clay stabilizing agent; and any combination thereof.

The filtercake breaker fluid can have desirable properties that can affect the pumpability and delay capability of the fluid. The filtercake breaker fluid can have a plastic viscosity in the range of 1 to 50 centipoise (cP) before hot rolling or after hot rolling at a temperature of 176° F. (80° C.). The filtercake breaker fluid can have a yield point in the range of 2 to 40 pounds per 100 sq. ft. (lb/100 $ft^2$) (0.96 to 19.2 Pa) before hot rolling or after hot rolling at a temperature of 176° F. (80° C.). The filtercake breaker fluid can have a 10 sec gel strength in the range of 1 to 30 lb/100 $ft^2$ (0.48 to 14.4 Pa) before hot rolling or after hot rolling at a temperature of 176° F. (80° C.).

The methods can include mixing the base fluid, the delayed acid, and the viscosifier together. According to any of the embodiments, the methods include the step of introducing the filtercake breaker fluid into a wellbore that penetrates a subterranean formation. The well can be an oil, gas, or water production well, a geothermal well, or an injection well. The well can be an on-shore well or an off-shore well. The well includes the wellbore. The subterranean formation can be part of a reservoir or adjacent to a reservoir. The well can include an annulus. The step of introducing the filtercake breaker fluid can include introducing the filtercake breaker fluid into a portion of the annulus. The methods can also include introducing one or more additional fluids before and/or after the step of introducing the filtercake breaker fluid.

The exemplary fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore drilling assembly 100. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure. It should also be noted that while FIG. 1 and the discussion of the FIGURE is for a drilling operation and fluid, other types of treatment fluids, such as spacer fluids, workover fluids, and stimulation fluids can be used with the disclosed equipment.

As illustrated, a drilling assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

One or more additional fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments; however, the additional fluids can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128 which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the disclosed fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, PDC bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

An embodiment of the present disclosure is a wellbore system comprising: a filtercake disposed on at least a portion of a wall of a wellbore that penetrates a subterranean formation; and a filtercake breaker fluid located within the wellbore, the filtercake breaker fluid comprising: a base fluid; a delayed acid, wherein the delayed acid generates an acid within the wellbore, wherein the acid causes the pH of the filtercake breaker fluid to decrease to a pH less than or equal to 5, and wherein the acid breaks the filtercake; and a viscosifier, wherein the viscosifier increases the viscosity of the filtercake breaker fluid prior to or after the filtercake breaker fluid is located within the wellbore. Optionally, a drilling fluid forms the filtercake on the wellbore wall. Optionally, the drilling fluid comprises a base fluid comprising a hydrocarbon liquid or water and one or more ingredients that form the filtercake. Optionally, the delayed acid is a delayed acid precursor selected from the group consisting of esters, aliphatic polyesters, orthoesters, poly (orthoesters), poly(lactides), poly(glycolides), poly($\xi$-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, any derivative of the foregoing, and any combinations thereof. Optionally, the delayed acid is an ester that is a formic acid precursor, and wherein the acid is formic acid. Optionally, the concentration of the delayed acid is in a range of 1% to 32% weight by weight of the base fluid. Optionally, the viscosifier increases the viscosity of the filtercake breaker fluid in a range of 10% to 60% compared to a control test fluid consisting of the base fluid and the delayed acid and in the same proportions as the filtercake breaker fluid except without the viscosifier. Optionally, the viscosifier increases the viscosity of the filtercake breaker fluid in a range of 2 to 20,000 cP compared to a control test fluid consisting of the base fluid and the delayed acid and in the same proportions as the filtercake breaker fluid except without the viscosifier. Optionally, the viscosifier increases the viscosity of the filtercake breaker fluid prior to or during being located in the wellbore, and wherein the viscosifier is a hydrophobically modified natural or synthetic polymer. Optionally, the hydrophobically modified polymer is a hydrophobically modified starch or starch derivative. Optionally, the hydrophobically modified starch is selected from the group consisting of cellulose, corn, potato, tapioca, and combinations thereof; or wherein the hydrophobically modified starch derivative is hydroxyethyl cellulose. Optionally, the amount of hydrophobic modification is in a range of 1% to 10% of the polymer. Optionally, the viscosifier increases the viscosity of the filtercake breaker fluid after the filtercake breaker fluid has been located within the wellbore, and wherein the viscosifier can be a viscoelastic surfactant. Optionally, the viscoelastic surfactant is an anionic, cationic, zwitterionic, or neutral viscoelastic surfactant that is acid-activated. Optionally, the viscoelastic surfactant is a cationic or neutral amine. Optionally, the neutral amine is oleyl amine ethoxylate. Optionally, the viscosifier is in a concentration in a range of 0.2 to 10 pounds per barrel (0.8 to 38.7 kilograms per cubic meters). Optionally, a control test fluid consisting of the base fluid and the delayed acid and in the same proportions as the filtercake breaker fluid except without the viscosifier breaks the filtercake within a period of time, wherein the viscosifier delays the breaking of the filtercake by the acid compared to the control test fluid, and wherein the delay is in a range of 30 minutes to 24 hours.

Another embodiment of the present disclosure is a method of breaking a filtercake on a wellbore wall comprising: introducing a filtercake breaker fluid into a wellbore that penetrates a subterranean formation, the filtercake breaker fluid comprising: a base fluid; a delayed acid; and a viscosifier, wherein the viscosifier causes the viscosity of the filtercake breaker fluid to increase before, during, or after introduction into the wellbore; causing or allowing the delayed acid to generate an acid after introduction into the wellbore, wherein the acid breaks at least a portion of the filtercake when the acid contacts the filtercake; and allowing the acid to break the portion of the filtercake on the wellbore wall, wherein the viscosifier delays the breaking of the portion of the filtercake by the acid compared to a control test fluid consisting of the base fluid and the delayed acid and in the same proportions as the filtercake breaker fluid except without the viscosifier. Optionally, a drilling fluid forms the filtercake on the wellbore wall. Optionally, the drilling fluid comprises a base fluid comprising a hydrocarbon liquid or water and one or more ingredients that form the filtercake. Optionally, the delayed acid is a delayed acid precursor selected from the group consisting of esters, aliphatic polyesters, orthoesters, poly(orthoesters), poly(lactides), poly(glycolides), poly($\iota$-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, any derivative of the foregoing, and any combinations thereof. Optionally, the delayed acid is an ester that is a formic acid precursor, and wherein the acid is formic acid. Optionally, the concentration of the delayed acid is in a range of 1% to 32% weight by weight of the base fluid. Optionally, the viscosifier increases the viscosity of the filtercake breaker fluid in a range of 10% to 60% compared to a control test fluid consisting of the base fluid and the delayed acid and in the same proportions as the filtercake breaker fluid except without the viscosifier. Optionally, the viscosifier increases the viscosity of the filtercake breaker fluid in a range of 2 to 20,000 cP compared to a control test fluid consisting of the base fluid and the delayed acid and in the same proportions as the filtercake breaker fluid except without the viscosifier. Optionally, the viscosifier increases the viscosity of the filtercake breaker fluid prior to or during being located in the wellbore, and wherein the viscosifier is a hydrophobically modified natural or synthetic polymer. Optionally, the hydrophobically modified polymer is a hydrophobically modified starch or starch derivative. Optionally, the hydrophobically modified starch is selected from the group consisting of cellulose, corn, potato, tapioca, and combinations thereof; or wherein the hydrophobically modified starch derivative is hydroxyethyl cellulose. Optionally, the amount of hydrophobic modification is in a range of 1% to 10% of the polymer. Optionally, the viscosifier increases the viscosity of the filtercake breaker fluid after the filtercake breaker fluid has been located within the wellbore, and wherein the viscosifier can be a viscoelastic surfactant. Optionally, the viscoelastic surfactant is an anionic, cationic, zwitterionic, or neutral viscoelastic surfactant that is acid-activated. Optionally, the viscoelastic surfactant is a cationic or neutral amine. Optionally, the neutral amine is oleyl amine ethoxylate. Optionally, the viscosifier is in a concentration in a range of 0.2 to 10 pounds per barrel (0.8 to 38.7 kilograms per cubic meters). Optionally, a control test fluid consisting of the base fluid and the delayed acid and in the same proportions as the filtercake breaker fluid except without the viscosifier breaks the filtercake within a period of time, wherein the viscosifier delays the breaking of the filtercake by the acid compared to the control test fluid, and wherein the delay is in a range of 30 minutes to 24 hours.

EXAMPLES

To facilitate a better understanding of the various embodiments, the following examples are given. Breakthrough tests were performed to evaluate different viscosifiers compared to control fluids. In a first series of tests, a water-based drilling mud was prepared with 4 barrels of mud mixed on a Silverson mixer at 6,000 rpm and then hot rolled at 150° F. (65.6° C.) for 16 hours. A filtercake was then formed with the mud on a 20 micrometer-sized ceramic disc at 150° F. (65.6° C.). The ingredients and concentrations in milliliters or kilograms per cubic meter (kg/m$^3$) and mixing times of the mud are shown below in Table 1.

TABLE 1

| Ingredients in order of addition | Mixing Time, min. | Concentration |
| --- | --- | --- |
| Fresh water, mL | 2 | 324 |
| Potassium chloride salt, kg/m$^3$ | | 39.9 |
| Viscosifier xanthan gum, kg/m$^3$ | 10 | 3.9 |
| Fluid loss additive cross-linked starch, kg/m$^3$ | 10 | 30.9 |
| pH buffer magnesium oxide, kg/m$^3$ | Mixed with | 3.9 |
| Bridging agent 5-micron sized CaCO$_3$, kg/m$^3$ | spatula | 123.7 |
| Bridging agent 25-micron sized CaCO$_3$, kg/m$^3$ | | 30.9 |

Four different filtercake breaker fluids were prepared to evaluate the effectiveness and the time for the breakthrough that indicates breaking of the filtercake. The filtercake breaker fluids had a base fluid of freshwater and a sodium bromide salt at a concentration of 10 ppg (1.198 kilograms per liter), and a delayed acid of an ester of a formic acid precursor at a concentration of 15% weight by weight. The control fluid #1 did not include a viscosifier. Reference fluid #2 included an unmodified hydroxyethyl cellulose (HEC) as the viscosifier to compare as a reference for a currently used viscosifier; fluid #3 included a viscoelastic surfactant of oleyl amine ethoxylate (OAE) as the viscosifier; and fluid #4 included a hydrophobically modified potato starch (HMS) as the viscosifier, all at a concentration of 1 pound per barrel (3.9 kg/m$^3$). The data from the breakthrough tests are shown below in Table 2 with the volume collected in units of milliliters (mL).

TABLE 2

| Fluid # | 1 (Control) | 2 (Reference) | 3 | 4 |
|---|---|---|---|---|
| Viscosifier | None | HEC | OAE | HMS |
| Initial pH | 1.33 | 1.86 | 6.8 | 1.75 |
| Volume collected, 1 hr. | '- | '- | '- | '- |
| Volume collected, 2 hrs. | 1 | '- | '- | '- |
| Volume collected, 3 hrs. | 2 | <0.5 | <0.5 | <0.5 |
| Volume collected, 4 hrs. | 4 | 2 | 2 | 1 |
| Volume collected, 5 hrs. | Continuous flow | 4 | 3 | 2 |
| Volume collected, 24 hrs. | '- | 8 | 4 | 6 |
| Final pH | 1.7 | 1.22 | 1.6 | 1.67 |

As can be seen in Table 2, the control fluid #1 without the viscosifier had breaking of the filtercake with continuous fluid flow in 5 hours. All of the fluids that contained a viscosifier had just a few drops collected at 3 hours compared to the 2 mL for the control fluid. The HMS had a longer delay of filtercake breaking compared to the HEC as evidenced by less fluid collected at the same time as the HEC. This indicates that the hydrophobically modified starch provides a longer delay of filtercake breaking than an unmodified hydroxyethyl cellulose. Moreover, when using a VES of oleyl amine ethoxylate, the initial pH was 6.8 compared to a final pH of 1.6, which is because OAE is an amine typically within a pH of 5 to 7. This delay in the increase in viscosity also delays the breaking of the filtercake as evidenced by the fact that only 4 mL was collected at 24 hours versus 8 and 6 mL for the HEC and HMS, respectively. This indicates that a VES can be used when a longer delay of filtercake breaking is desired.

In a second series of tests, a water-based drilling mud was prepared with 4 barrels of mud mixed on a Silverson mixer at 6,000 rpm and then hot rolled at 150° F. (65.6° C.) for 16 hours. A filtercake was then formed with the mud on a 20 micrometer-sized ceramic disc at 150° F. (65.6° C.). The ingredients and concentrations in milliliters or kilograms per cubic meter (kg/m$^3$) and mixing times of the mud are shown below in Table 3.

TABLE 3

| Ingredients in order of addition | Mixing Time, min. | Concentration |
|---|---|---|
| Fresh water, mL | 2 | 324 |
| Potassium chloride salt, kg/m$^3$ |  | 39.9 |
| Viscosifier xanthan gum, kg/m$^3$ | 10 | 2.9 |
| Fluid loss additive cross-linked starch, kg/m$^3$ | 10 | 23.2 |
| pH buffer magnesium oxide, kg/m$^3$ | Mixed with spatula | 3.9 |
| Bridging agent 5-micron sized CaCO$_3$, kg/m$^3$ |  | 87.0 |
| Bridging agent 25-micron sized CaCO$_3$, kg/m$^3$ |  | 29.0 |

Five different filtercake breaker fluids were prepared to evaluate the effectiveness and the time for the breakthrough that indicates breaking of the filtercake. The filtercake breaker fluids had a base fluid of freshwater and a sodium bromide salt at a concentration of 10 ppg (1.198 kilograms per liter), and a delayed acid of an ester of a formic acid precursor at a concentration of 10% weight by weight. The control fluid #1 did not include a viscosifier. Reference fluid #2 included an unmodified hydroxyethyl cellulose (HEC) as the viscosifier to compare as a currently used viscosifier; fluid #3 included a viscoelastic surfactant of oleyl amine ethoxylate (OAE) as the viscosifier; reference fluid #4 included a non-hydrophobically modified potato starch (starch) to compare against a hydrophobically modified starch; and fluid #5 included a hydrophobically modified potato starch (HMS) as the viscosifier, all at a concentration of 1 gram. Table 4 shows the rheological (600 to 3 rpm) properties, plastic viscosity (PV) in centipoise (cP), yield point (YP) in Pascals (Pa), and 10-second gel strength in Pa; while the data from the breakthrough tests are shown below in Table 5 with the volume collected in units of milliliters (mL) at a time in hours. Continuous flow is listed as "CF."

TABLE 4

| Fluid # | 1 (Control) | 2 (Reference) | 3 | 4 (Reference) | 5 |
|---|---|---|---|---|---|
| Viscosifier | None | HEC | OAE | Starch | HMS |
| 600 rpm | 2 | 16 | 21 | 4 | 4 |
| 300 rpm | 1 | 9 | 12 | 2 | 2 |
| 200 rpm | 1 | 6 | 7 | 2 | 2 |
| 100 rpm | 1 | 3 | 5 | 1 | 1 |
| 6 rpm | 1 | 1 | 2 | 1 | 1 |
| 3 rpm | 1 | 1 | 1 | 1 | 1 |
| PV, cP | 1 | 7 | 9 | 2 | 2 |
| YP, Pa | 0.48 | 0.96 | 1.44 | 0.96 | 0.96 |
| 10-s. gel, Pa | 0.48 | 0.48 | 0.48 | 0.48 | 0.48 |

TABLE 5

| Fluid # | 1 (Control) | 2 (Reference) | 3 | 4 (Reference) | 5 |
|---|---|---|---|---|---|
| Viscosifier | None | HEC | OAE | Starch | HMS |
| Initial pH | 1.33 | 1.86 | 6.8 | 1.65 | 1.75 |
| 1 hr. | 1 | Drops | 0.5 | <1 | Drops |
| 2 hrs. | 3 | 1.6 | 1.5 | 1 | 1.8 |
| 3 hrs. | 4 | 4.5 | 2.4 | 4.5 | 2.6 |
| 4 hrs. | CF | 5.4 | 3 | 5.8 | 3.4 |
| 5 hrs. | CF | 6 | 4 | CF | 3.6 |
| 6 hrs. | CF | CF | 5 | CF | 4 |
| 7 hrs. | CF | CF | 7.2 | CF | CF |
| 8 hrs. | CF | CF | CF | CF | CF |
| 24 hrs. | Clean up | Clean up | Clean up | Clean up | Clean up |
| Final pH |  | 1.7 | 1.22 | 1.6 | 1.67 |

As can be seen in Tables 4 and 5, at the same concentration, the OAE had higher values for the rheological profile, PV, and YP compared to the HEC. This indicates that HEC becomes viscous at or near the time of mixing; whereas OAE does not increase the viscosity until the fluid becomes acidic. However, when comparing OAE to HEC for the breakthrough test, OAE provided a much longer delay in breaking the filtercake up to 8 hours versus only 5 hours for HEC. Next, when comparing HMS (fluid #5) to the unmodified starch (fluid #4), both fluids had identical rheological profiles, PVs, and YPs. This indicates that HMS exhibits good fluid properties. However, when comparing HMS to the starch for the breakthrough test, HMS provided an hour longer delay in breaking the filtercake up to 6 hours versus only 5 hours for the starch. In order to provide a longer delay, the concentration of the viscosifier can be increased. This indicates that the choice of the viscosifier as well as the concentration can be selected to tailor the time it takes to break the filtercake based on the specifics of each well. The choice of the viscosifier and the concentration can also be selected depending on whether the drilling fluid is a water-based fluid or an oil-based fluid, and whether it is desirable to delay the increase in viscosity until after the filtercake breaker fluid is pumped into the wellbore.

Therefore, the various embodiments are well adapted to attain the ends and advantages mentioned as well as those that are inherent therein. The particular embodiments disclosed above are illustrative only, as the various embodiments may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more ingredients, etc., as the case may be, and do not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A wellbore system comprising:
    a filtercake disposed on at least a portion of a wall of a wellbore that penetrates a subterranean formation; and
    a filtercake breaker fluid located within the wellbore, the filtercake breaker fluid comprising:
        a base fluid;
        a delayed acid, wherein the delayed acid generates an acid within the wellbore, wherein the acid causes the pH of the filtercake breaker fluid to decrease to a pH less than or equal to 5, and wherein the acid breaks the filtercake; and
        a viscosifier, wherein the viscosifier increases the viscosity of the filtercake breaker fluid prior to, during, or after the filtercake breaker fluid is located within the wellbore,
    wherein a control test fluid consisting of the base fluid and the delayed acid and in the same proportions as the filtercake breaker fluid except without the viscosifier breaks a filtercake within a period of time, wherein the viscosifier of the filtercake breaker fluid delays the period of time of the breaking of the filter cake of the control test fluid, and wherein the delay is greater than or equal to 30 minutes.

2. The wellbore system according to claim 1, wherein a drilling fluid forms the filtercake on the wellbore wall.

3. The wellbore system according to claim 2, wherein the drilling fluid comprises a base fluid comprising a hydrocarbon liquid or water and one or more ingredients that form the filtercake.

4. The wellbore system according to claim 1, wherein the delayed acid is a delayed acid precursor selected from the group consisting of esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, any derivative of the foregoing, and any combinations thereof.

5. The wellbore system according to claim 1, wherein the delayed acid is an ester that is a formic acid precursor, and wherein the acid is formic acid.

6. The wellbore system according to claim 1, wherein the concentration of the delayed acid is in a range of 1% to 32% weight by weight of the base fluid.

7. The wellbore system according to claim 1, wherein the viscosifier increases the viscosity of the filtercake breaker fluid in a range of 10% to 60% compared to a viscosity of the control test fluid.

8. The wellbore system according to claim 1, wherein the viscosifier increases the viscosity of the filtercake breaker fluid in a range of 2 to 20,000 cP compared to a viscosity of the control test fluid.

9. The wellbore system according to claim 1, wherein the viscosifier increases the viscosity of the filtercake breaker fluid prior to or during being located in the wellbore, and wherein the viscosifier is a hydrophobically modified natural or synthetic polymer.

10. The wellbore system according to claim 9, wherein the hydrophobically modified polymer is a hydrophobically modified starch or starch derivative.

11. The wellbore system according to claim 10, wherein the hydrophobically modified starch is selected from the group consisting of cellulose, corn, potato, tapioca, and combinations thereof; or wherein the hydrophobically modified starch derivative is hydroxyethyl cellulose.

12. The wellbore system according to claim 9, wherein the amount of hydrophobic modification is in a range of 1% to 10% of the polymer.

13. The wellbore system according to claim 1, wherein the viscosifier increases the viscosity of the filtercake breaker fluid after the filtercake breaker fluid has been located within the wellbore, and wherein the viscosifier can be a viscoelastic surfactant.

14. The wellbore system according to claim 13, wherein the viscoelastic surfactant is an anionic, cationic, zwitterionic, or neutral viscoelastic surfactant that is acid-activated.

15. The wellbore system according to claim 14, wherein the viscoelastic surfactant is a cationic or neutral amine.

16. The wellbore system according to claim 15, wherein the neutral amine is oleyl amine ethoxylate.

17. The wellbore system according to claim 1, wherein the viscosifier is in a concentration in a range of 0.2 to 10 pounds per barrel (0.8 to 38.7 kilograms per cubic meters).

18. The wellbore system according to claim 1, wherein the delay is in a range of 30 minutes to 24 hours.

\* \* \* \* \*

UNITED STATES PATENT AND TRADEMARK OFFICE
CERTIFICATE OF CORRECTION

PATENT NO. : 12,503,930 B1  
APPLICATION NO. : 18/751645  
DATED : December 23, 2025  
INVENTOR(S) : Sharad Bhimrao Gotmukle, Nivika Rajendra Gupta and William W Shumway Page 1 of 1

It is certified that error appears in the above-identified patent and that said Letters Patent is hereby corrected as shown below:

In the Claims

Column 23, Line 9, Claim 13, the text "can be" should be changed to -is-

Signed and Sealed this
Twenty-seventh Day of January, 2026

John A. Squires
*Director of the United States Patent and Trademark Office*